United States Patent

[11] 3,553,456

[72] Inventors John Ronald Parks;
 Ralph Eric Rengger, Teddington, England
[21] Appl. No. 733,558
[22] Filed May 31, 1968
[45] Patented Jan. 5, 1971
[73] Assignee National Research Development Corporation
 London, England
 a corporation of Great Britain
[32] Priority May 31, 1967
[33] Great Britain
[31] No. 25,183/67

[54] READING OF PROJECTED TRACE ERRORS
 16 Claims, 10 Drawing Figs.
[52] U.S. Cl. .................................................. 250/202,
 250/219; 356/167
[51] Int. Cl. ....................................................... G01n 21/30,
 G01b 1/00
[50] Field of Search .......................................... 250/202,
 219₁ₐ, 219F, 219Wd; 356/167

[56] References Cited
 UNITED STATES PATENTS
| | | | |
|---|---|---|---|
| 3,094,623 | 6/1963 | Weiss ........................... | 250/219Lth |
| 3,335,287 | 8/1967 | Hargens III .................. | 250/202X |
| 3,428,817 | 2/1969 | Hofmeister et al. .......... | 250/219Lg |

OTHER REFERENCES
Norrie et al., " An Automatic Digital Curve Reader," Journal of Scientific Instruments, Vol. 42, No. 5, May 1965, pp. 356— 57. 250/2191 ₐ

Primary Examiner—James W. Lawrence
Assistant Examiner—A. M. Leedom
Attorney—Cushman, Darby and Cushman ABSTRACT: A method and apparatus are disclosed in which a trace is optically projected on photocells incorporated in electrical circuitry providing a signal indicating the nearest photocell to a reference point on which the trace image is incident. The photocells can be positioned in line from the reference point and the image rotated around the point. The trace can be related to a standard profile, the distance of its image from the reference point representing divergences of workpiece profile from the standard. Provision can be made for providing a further signal indicating the direction of any such divergence. Provision can also be made for suppression of the signals except when they result from incidence on a photocell of light intensity greater than ambient intensity. In an alternative arrangement, the photocells comprise rings concentric on the reference point. The photocells may instead from a semicircular array, the image being doubled about the edge diameter thereof, or a pair of such arrays, the image being duplicated for projection on each array.

READING OF PROJECTED TRACE ERRORS

The invention relates to the measurement of displacement from a reference point of a projected image line.

The invention is particularly but not exclusively applicable to the profile tracking and testing method and apparatus of British Pat. 882,075 published on Nov. 8, 1961. In accordance with the disclosure of that specification, a standard profile is tracked by a feeler or probe to produce a trace related to the standard profile. The trace can be made by the action of a stylus or scriber on a coated plate so that the trace can be optically projected. A workpiece having a profile intended to correspond to the standard profile can then be tested by tracking the workpiece profile with the feeler preferably using the same apparatus as before so that any peculiarities of the apparatus which would otherwise falsify the result are canceled out. Instead of making a second trace, the standard trace is optically projected. Any divergencies of the workpiece profile from the standard profile will then result in displacements of the projected trace image from a reference position representing the point of the scriber.

In accordance with specification 882,075, the trace image can be projected onto a screen marked with a graticule or a tolerance circle. Errors are noted by visual inspection of the screen and may be measured manually. It is an object of the present invention to provide a method and apparatus which can be used for reading and recording such errors.

The invention accordingly provides apparatus for measuring displacement from a reference point of a radiantly projected image of a trace, the apparatus comprising a plurality of elements arranged to produce an electric output in response to incidence of the projected image thereon, the elements being at positions differently spaced from the reference point, and electric circuit means including the elements and arranged to afford an electric signal indicating the nearest element to the reference point on which the radiation is incident.

The invention also provides apparatus for measuring differences between a workpiece profile and a standard profile, the apparatus comprising a device having a stylus, a member on which a trace for optical projection can be formed by movement of the stylus thereon, a feeler, means for mounting a standard element having a standard profile, and means linking the feeler, the stylus, the member and the mounting means so that as the feeler tracks the standard profile the stylus forms a trace related thereto on the member, optical projection means for projecting an image of the trace on a plurality of photosensitive elements spaced at different distances from a reference point corresponding to the stylus position, and electric circuitry including the elements arranged to produce a signal indicating the nearest element to the reference point on which the projected trace image is incident, whereby, on removal of the stylus and replacement of the standard profile by a workpiece profile, any signal produced during tracking of the workpiece profile by the feeler and projection of the trace image on the elements will indicate displacement of the image from the reference point due to a difference of the workpiece profile from the standard profile. The invention also provides a method of measuring differences between a workpiece profile and a standard profile, the method comprising the steps of relatively moving a feeler and the workpiece profile so that the feeler tracks the workpiece profile thereby effecting relative movement of a member, the member carrying a trace for optical projection, and a plurality of photosensitive elements on which an image of the trace is optically projected, the elements being differently spaced from a reference point, the trace being such that the projected image thereof passes through the reference point except when the feeler is tracking a part of the workpiece profile which differs from the standard profile, and deriving from the elements an electric signal indicating the element nearest the reference point on which the projected trace image is incident.

The error can thus be measured in terms of the position of the energized photosensitive elements, account being taken of any magnification of the optical projection system used. The array of photosensitive elements can be a line of photocells extending from the reference point, relative rotation about this point being effected between the trace image and the array conveniently by use of a dove prism to rotate the image. Instead the photosensitive elements can be circular concentric rings or half rings so that the array is semicircular in shape. With the latter arrangement either the array of elements is duplicated or the trace image is doubled about the edge diameter of the array. The error at any time is measured in terms of the position of the cell nearest the reference point that is energized during one rotational cycle.

It is necessary to detect the photosensitive element affording the largest output and electronic means are provided to do this. The arrangement can include sense detecting cells for determining whether an error is positive or negative.

The invention will be more fully understood and its advantages better appreciated by reference to the following description of embodiments thereof and the accompanying drawings which illustrate these embodiments. This disclosure is given by way of example only and is not to be understood as in any way limiting the scope of the invention.

IN THE DRAWINGS

Figure 9:
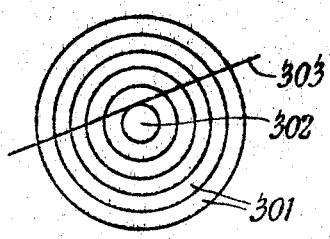
Figure 10:
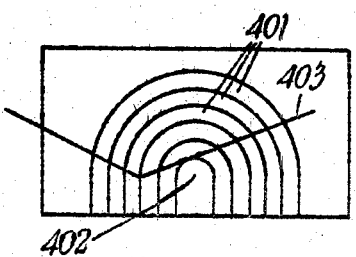

FIG. 9 schematically illustrates an alternative means of carrying the invention into effect; and FIG. 10 schematically illustrates yet another means of carrying the invention into effect.

The Optical System

The optical system 10 of the apparatus illustrated comprises a lamp 12 backed by a concave mirror 14 to direct light through a condensing lens system 16, 17. The illustrated mirror 18 between the lenses 16, 17 of the system is provided only for the sake of convenient relative location of the parts on suitable support arrangements (not shown). A chopper, comprising a fan 20 with 7 blades is electrically driven by a 50 Hz. mains-fed synchronous motor 21 so that the chopping rate is 350 Hz., is placed at the first focus point of the light beam between the lenses of the system 17. Light from the lens system 17 falls on a dye plate master 22 bearing the trace and the portion of the light transmitted through the plate passes through a magnifying lens system 24 and is then split by a half-silvered mirror 26. The master 22 can be moved by means to be described as a workpiece profile is tested against a standard profile to which the trace is related. The transmitted beam is reflected by mirrors 28, 30 on a screen 32 for visual observation and the reflected beam passes through a dove prism 34 aligned with the axis 36 of the reflected beam, the prism being rotated by drive means 38 to rotate the projected trace about the axis,

The Photocell Array

The photocell array 40 comprises eight error cells 42 stacked in line, the optical axis 36 bisecting the outer edge of one of the end cells.

To distinguish positive from negative errors, the array also includes a positive sense cell 44 and a negative sense cell 46 spaced from but aligned with the error cells 42. A trace which is oversize is cut on the dye master plate 22, as well as the perfect or standard trace. The sense cells 44, 46 are spaced from the optical axis 36 by amounts such that the projected image 48 of the second trace line passes over one but not the other of these cells, depending upon the sense of the error. It can be seen from the drawings that if the projected image 50 of the normal trace falls on the optical axis 36 the oversize trace will pass inside the negative sense cell 46 and outside the positive sense cell 44. In the event that the normal trace image 50 is displaced from the optical axis 36 in the direction representing a negative sense error, the oversize trace line image 48 will intersect the negative cell 46 but when it comes round to the positive sense cell 44 it will pass even further beyond it than before. Conversely, if the error is positive the oversize trace image sweeps a circle nearer to the optical axis 36 than would be the case with a negative error and it therefore intersects the positive sense 44 cell but passes inside the negative sense cell 46. To avoid complications which could arise when there is a sharp bend in the trace line, which might lead to false readings if the error cells 42 were in action for a whole revolution of the image, it is arranged by means to be described that a reading is taken only when the error cells 42 and one of the sense cells 44, 46 are simultaneously giving a signal. It will be evident that the additional trace on the dye plate master 22 could be undersize instead of oversize if the positions of the sense cells were suitably adjusted.

The photocell array is completed by a balance or background cell 52, for a purpose to be later described. The cell 52 is of the same area as the eight error cells 42, taken together, and is positioned adjacent these cells.

The Electric Circuitry

Figure 2:
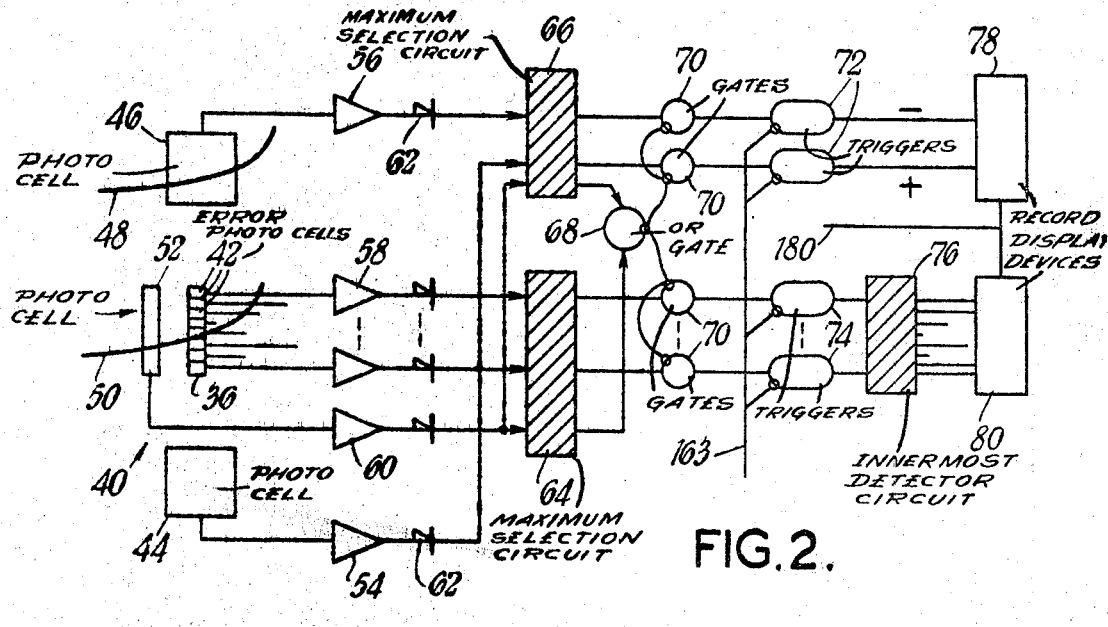
FIG. 2 is a schematic view of an array of photocells on which the image is projected and includes associated electric circuitry in block form.

As shown in FIG. 2, the outputs of photocells 44, 46 are applied to amplifiers 54, 56 respectively. Each error cell 42 is similarly associated with a respective one of amplifiers 58. The output of the balance cell 52 is taken to an amplifier 60.

The outputs of all the photocells are modulated because of the rotating 'chopper' 20 placed in the optical system. The outputs of the error measuring photocells 42 are very small, of the order of 0.04 $\mu a.$, and are amplified to approximately 2 volts peak to peak for use in operation of subsequent circuits. The amplifiers 54, 56, 58, 60 are tuned to the chopping frequency so that any stray fluctuating or constant light incident on the photocell array, as from fluorescent light fittings or sunlight, does not interfere with the operation of the apparatus. The output from each amplifier is double peak rectified and smoothed in a short time constant by a diode detector 62 to produce a constant DC voltage proportional to the chopped light intensity falling on a cell.

These DC voltages are compared in two groups to determine which is the largest in amplitude within a group in the maximum selection circuits 64, 66. The first output group, treated in selection circuit 64, comprises the rectified amplifier outputs derived from the error cells 42 together with that from balance cell 52. The second group, fed to selection circuit 66, comprises those derived from the two sense cells 44, 46, with that from the balance cell 52 again included. Each group of outputs is carried through the relevant maximum selection device, and through gates 68, 70 the purpose of which is described below, to digital triggers 72, 74 functioning as memory devices. At the completion of each cycle of operation, that is, rotation of the dove prism 34, the error cell 42 which produces the largest instantaneous output during that cycle and which is nearest to the zero error cell at the reference point must be determined. This function is performed by an "innermost" detector circuit 76.

Finally, the outputs from the innermost detector circuit 76 and the sense cell triggers 72 are recorded and/or displayed by any convenient devices 78, 80, for example, strip printers, digital indicators, typewriters and the like.

Logical Validity Check

The balance or background cell 52 is arranged to give an output slightly greater than that of any of the other cells when only ambient light is incident on the cells. If no error cell output exceeds the balance cell output then it follows that no error cell is illuminated by the trace. Similarly, if neither sense cell output exceeds the balance cell output, neither sense cell is illuminated by the trace. The gates mentioned above are provided to ensure that outputs from the maximum selection devices 64, 66 are stored in the digital triggers 72, 74 if and only if the balance output is exceeded in both the devices. Thus in the absence of a trace the maximum selection circuits 64, 66 will supply outputs to the OR gate 68 which will in turn supply outputs to all the gates 70 to prevent other outputs from these circuits reacting the triggers 72, 74. The gate operation is further described below in connection with the trigger circuit details. This is a logical validity check which prevents spurious responses being recorded.

The inclusion of the trace in the validity check makes it possible to discriminate between traces of different orientation which may fall simultaneously on the error cells. Since an error measurement can be recorded only in the presence of the trace, restriction of the length of the trace will permit recording to be made for strictly limited orientation of the trace. This condition would be infringed only if an interfering trace line were to pass through the zero error cell. It should be possible to guard against this by careful selection of the error inspection positions.

The Amplifier Circuits

Figure 3:
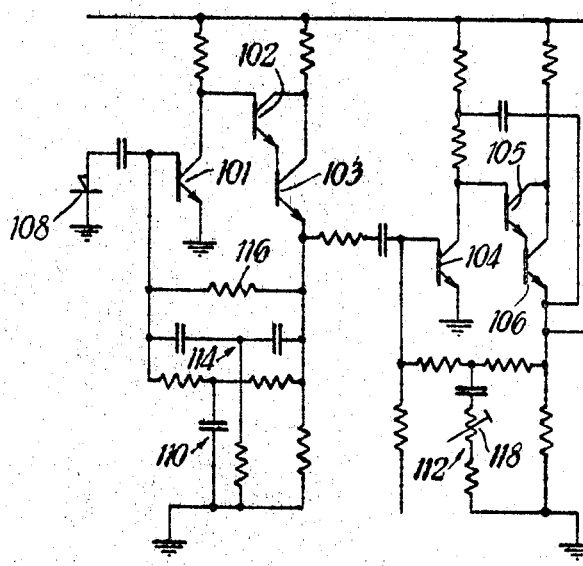
FIG. 3 is a circuit drawing of a tuned amplifier included in the circuitry.

Each amplifier circuit, 54, 56, 58, 60 as shown in FIG. 3, consists of two cascaded amplifying stages including transistors 101, 102, 103 and 104, 105, 106 respectively, the output of the associated photocell, indicated at 108, being applied to the base of the transistor 101. The amplifier gains are controlled by parallel feedback networks 110, 112.

The first stage operates as a current-to-voltage converter and has a transfer impedance of 100 K. at the chopper frequency (350 Hz.). The amplifier is tuned by a parallel T-feedback network 114 and has a maximum transfer impedance limited to 100 K. by the resistor 116 of that value shown shunted across it.

The second stage is a high gain voltage amplifier with a gain of approximately 1,500 which can be varied by means of a preset potentiometer 118 in the feedback loop 112.

The Detector Circuit

Figure 4:
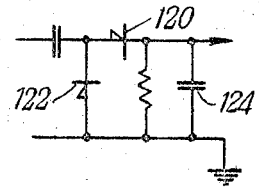
FIG. 4 is a circuit drawing of a detector included in the circuitry.

FIG. 4 shows the circuit of the detectors 62 in which the amplifier output is double peak rectified by diodes 120, 122. The rectified output is a positive going DC voltage smoothed by a time constant of 25 $\mu sec.$ by capacitor 124 which acts as a reservoir for the rectifier.

The Maximum Selection Circuits

Figure 5:
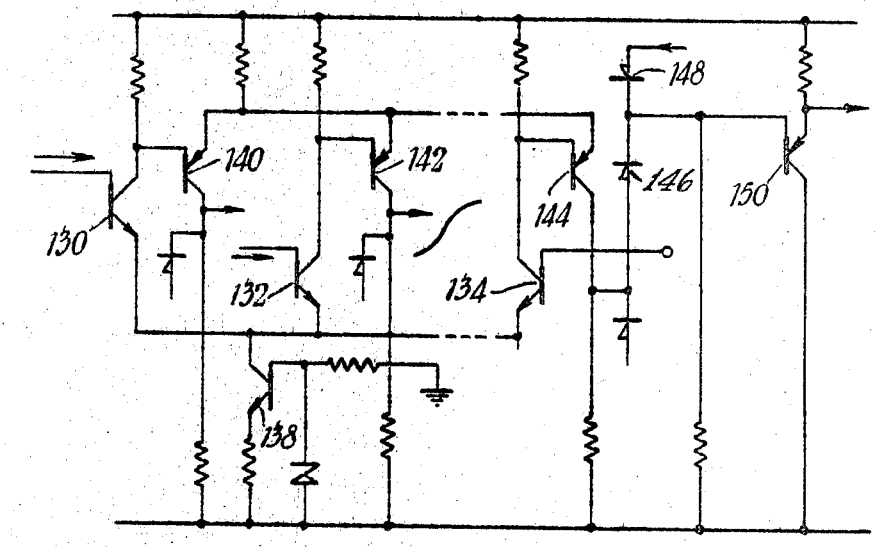
FIG. 5 is a circuit drawing of a maximum selection circuit included in the circuitry.

The maximum selection circuits 64, 66, shown in FIG. 5, use an extension of the long-tailed or differential pair which will be called the long-tailed-many. The output from each detector circuit 62 is applied to the base of a respective one of transistors 130, 132, 134, connected in the common emitter mode and fed from a high impedance current source comprising a further transistor 138 operated under constant current conditions. The arrangement thus effects that the largest proportion of the current supplied by the transistor 138 goes to that one of the transistors 130, 132,...134 having the most positively biased base. If the base of one transistor is sufficiently more positive than the rest, by a differential of about 1 volt, then all the available current from the transistor 138 goes to that transistor.

To obtain discrimination with a differential less than a volt, the outputs of the first long-tailed-many, comprising the transistors 130, 132,..134, are taken directly to a second long-tailed-many, comprising transistors 140, 142,..144, which bring the overall differential of the selector device down to a few millivolts. This is because the first long-tailed-many amplifies the input difference by a large factor, so producing a greater differential for the second long-tailed-many. The output corresponding to the largest input is positive going and moves, say, from −2 volts to −6 volts.

To effect the logical validity check, the triggers 72, 74 provided to store the magnitude and sense of the error must not be set if the largest output is from the balance cell 52 in either output group. The OR gate 68 in which the balance cell outputs from the two maximum selection networks are OR'ed together is shown in FIG. 5 as a diode OR gate comprising diodes 146, 148. The output of the gate 68 feeds to the base of an emitter follower transistor 150 which provides a gate output of approx +6 volts when off and −2 volts when on. The output is used to inhibit signals tending to set the trigger circuits as described below.

The Trigger Circuits

Figure 6:
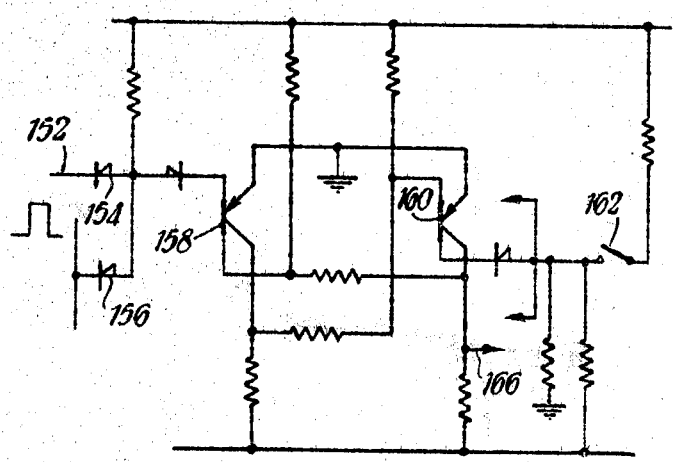
FIG. 6 is a circuit drawing of a trigger circuit included in the circuitry.

The circuit of one of the storage triggers 72, 74 is shown in FIG. 6. The input is applied on line 152 to the gate 70 constituted as an inhibit gate comprising diodes 154, 156. If the gate signal is present, that is, negative, positive going input signals are prevented from setting the trigger. In the absence of the negative gate signal, the positive excursion of the input sets the trigger circuit. The trigger circuit itself comprises transistors 158, 160 operated between +12-volts and −12-volt lines, as are those of the other circuits, and is of conventional design.

Figure 1:
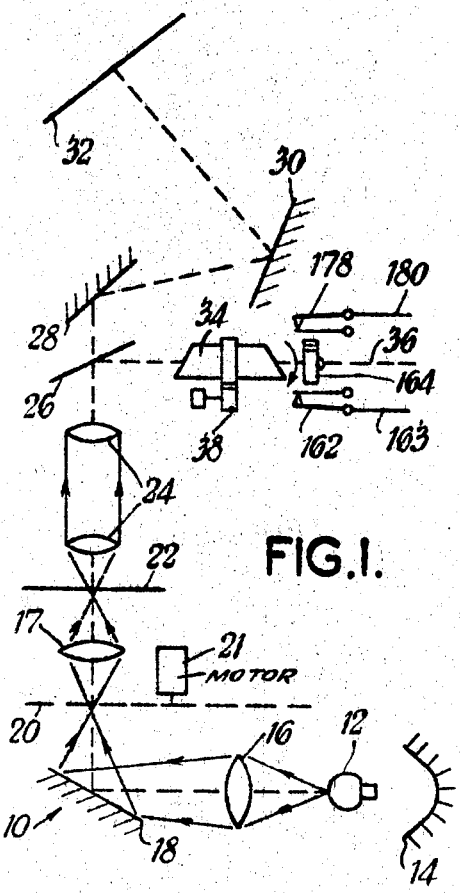
FIG. 1 is a schematic view of an optical projection system, for projecting an image of a trace on a member along an optical axis and for rotating the image about the axis.

A reset means is operated by a switch 162 operated as shown in FIG. 1, by a cam 164 attached to the rotating dove prism 34. Closure of the switch 162 changes the conditions of a potential divider so that a positive voltage is applied to the base of the transistor 160 by which the trigger is reset to the off condition. The reset line is common to all triggers as shown in FIG. 2. The output on line 166 from each trigger has a value of −12 volts when the trigger is off or reset and 0 volts when set.

The Innermost Detector Circuit

The outputs of the error cell trigger circuits 74 must be inspected to determine the smallest error detected during one cycle of operation so as to identify the innermost error cell on which the projected trace image falls. This is done by the innermost detector circuit 76 of FIG. 7 which consists of a long-tailed-pair for each trigger input. The long-tailed-pairs including transistors 168, 170 and 172, 174 etc., are arranged so that successive pairs are connected to the right-hand transistors of the preceeding pairs and all are fed from a common current source including a transistor 176.

In the absence of a trigger input each long-tailed-pair directs the current supplied to its common emitter terminal 169, 173, etc. to the right-hand member, transistor 170, 174, of the pair, the bases of the right-hand members being biased positively with respect to the left-hand member.

The current supplied by the transistor 176 will ascend through the right-hand transistor in each pair and no output will occur. When any trigger in this situation is reversed, any current arriving at the common emitter terminal 169, 173 etc. of a pair will be deflected to the left-hand member. If one or more triggers are set then all the current supplied by the transistor 176 will go to the left-hand transistor of the lowest pair in the stack and this will be the only output. The triggers are connected in order ranging from the smallest to the largest errors, starting with the bottom long-tailed-pair 168, 170. This ensures that the single stack output corresponds to the innermost, that is, smallest, detected error.

Figure 7:
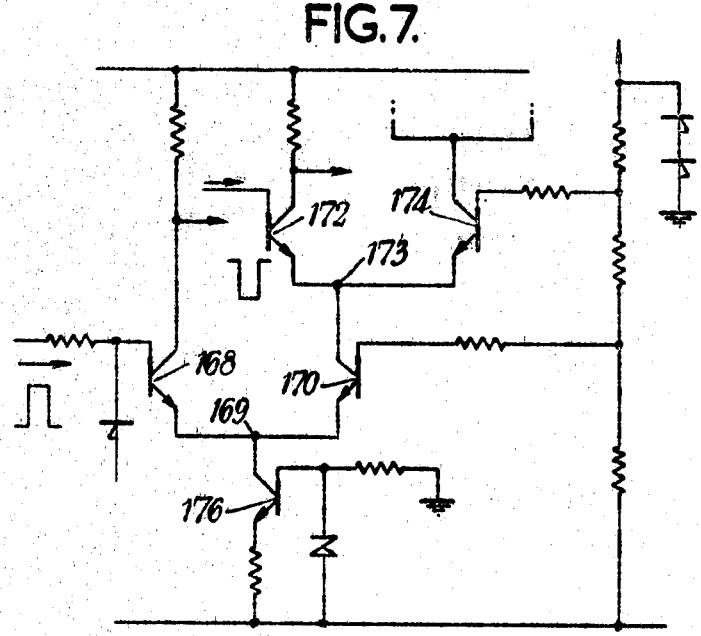
FIG. 7 is a circuit drawing of an "innermost" detector circuit included in the circuitry.

As will be clear from FIG. 7, the innermost detector circuit gives an output continuously during a cycle of operation.

Only the final condition of the system at the completion of a cycle, when the switch contacts 162 are about to close, is recorded. This timing is obtained by a second pair of switch contacts 178 operated by the cam 164 so as to close just before the contacts 162. The contacts 178 effect triggering of the error recording or like devices 78, 80 by means of connecting line 180.

The Trace Bearing Member

Figure 8:
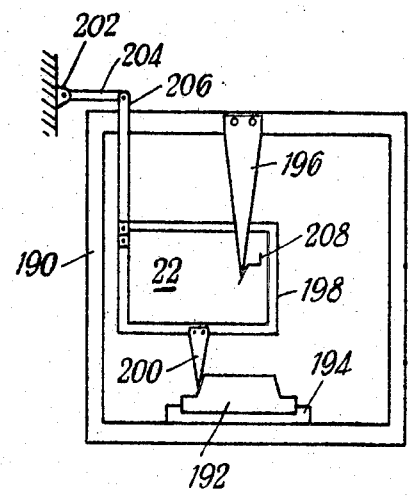
FIG. 8 is a schematic plan view of a device for guiding the movement of the trace bearing member, during the making and the projection of the trace.

A device by which the trace may be formed on the member and which can be used in tracking a workpiece profile is illustrated in FIG. 8.

The device comprises a frame 190 on which is secured a standard article or a workpiece 192, providing respectively the standard profile or a profile to be tested, by mounting means 194. The frame 190 also mounts a scriber or stylus 196.

An inner frame 198 carries the member 22 and has a feeler 200 for tracking the profile of the article or workpiece 192. Movement of the inner frame 198 is constrained by its being coupled to a fixed position 202 by a pivotal linkage 204, 206.

As the inner frame 198 is moved, conveniently by hand, so that the point of the feeler is tracked over the profile of a standard article in the mounting means 194, the stylus 196 cuts a related but not identical trace 208 over the member 22. The oversize trace for providing the projected image 48 is cut on the member simultaneously by a second suitably positioned stylus (not shown). The trace bearing member 22 can comprise a glass plate with the trace cut in emulsion, for example, Aralin dye, on the glass.

For use in the apparatus of FIG. 1, the scriber 196 is removed and the device positioned with the member 22 in the position relative to the optical projection system indicated in the FIG., the optical axis through the lenses 17 and 24 being arranged to pass through the position occupied by the point of the scriber. With the workpiece to be tested in the mounting means 194 the frame is again moved to track the feeler 200 over the profile, so that the trace 208 is projected on the photocell array as the trace image 50.

Alternative forms of the device can be employed. For example the workpiece can be mounted on the inner frame and the feeler member on the outer frame. The movement of the inner frame can be restrained in different ways for example the frame can be allowed to move only in directions parallel to the sides of the outer frame; the trace will then relate identically instead of indirectly to the profile. It is in any event an advantage to use the same device both for forming the trace and for projecting it, so that any irregularities introduced by the device are canceled out.

The Photocells

Selenium photocells are preferred to silicon cells for the cells 42, 44, 46, 52 to prevent swamping of the trace image by infrared radiation, to which silicon cells are very sensitive and which passes through the emulsion on the member 22. To improve the contrast between light passing through the trace and that passing through the background emulsion, a filter would be desirable, but cannot be used in conjunction with the error detecting cells 42 without an increase in the intensity of the light source to compensate for the absorption of the filter at the preferred wavelength. A filter can, however, be used with advantage in conjunction with the sense cells 44, 46 which are much larger than the error cells so as to respond to the oversize trace whenever the standard trace intersects the error cells. To improve discrimination between the ambient background and the oversize trace, the error cells should have maximum convenient width which is limited to not more than one increment in the error scale.

If a large number of error cells 42 are used, the ratio of the signals due to the trace and to the background ambience will be less for the sense cells 44, 46 than for the error cells in spite of the increase in secondary trace width. The absolute magnitude of the signals from the sense cells may be increased by making their width comparable or greater than their height, which is slightly greater than the height of the error cell strip. With an increase in the absolute signal magnitude the loss due to the use of the optical filter can be tolerated and an increase in the relative magnitudes of the signal due to the trace and the background obtained.

Alternatively, a separate balance cell can be used with each sense cell, so that the oversize trace can be increased in width beyond one error increment. The extra balance cell must be situated adjacent to the edge of the associated sense cell corresponding to zero error. At zero error the outputs of the two associated cells are arranged to balance; any deviation from balance then indicates the sense of the error detected. Strictly, only only one pair strictly, such cells is required but to maintain the security of operation obtained by observing the simultaneous occurrence of an error and its sense a pair of sense and balance cells must be provided in each of positions indicated.

As will be evident the apparatus according to the invention illustrated and described indicates whether errors represent an undersize or oversize workpiece and allows readings to be taken either continuously or at specified points on the workpiece profile. Apparatus of this kind with an optical system magnification of x100 and photocells 0.1 inch square will work satisfactorily with trace lines as narrow as 0.0001 inch wide, indicating errors in increments of 0.001 inch.

In accordance with a further way of carrying the invention into effect, illustrated in FIG. 9, the photocell array comprises concentric ring-shaped photosensitive elements 301 centered on the reference point, 302 forming a complete bull's-eye array. An image 303 of the trace is projected optically onto the array at a suitable known magnification as by the optical system of FIG. 1 modified by the omission of the dove prism which is not of course required in view of the circular form of the photocells, which are centered so that the projection axis 36 passes through the point 302. At any instant as the trace image 303 traverses the photocell array, an error in the workpiece corresponding to a spacing of the trace from the reference point is measured in terms of the innermost ring element 301 to be energized, which ring will include the spacing between its inner and outer diameters. To determine whether the workpiece is undersize or oversize, the feeler is withdrawn from contact and an observation is made as to whether or not the trace crossed the center of the photocell array.

In accordance with yet another method of carrying the invention into effect, illustrated in FIG. 10, the photocell array comprises semicircular concentric photosensitive elements 401 in a half bull's-eye arrangement centered on the reference point 402. The elements, of silicon for example, can have contacts attached at the edges instead of through the back of the element as with the elements of FIG. 9, which are expensive to produce, and the signal-to-noise ratio is somewhat improved because of the smaller ring area.

With the photocell array of FIG. 10, two images 403 of the trace are produced by means of semisilvered mirror and a biprism in the optical projection system. Each image is projected onto a separate array, the intensity of the images being balanced by adjustment of the position of the biprism across the optical axis of the system.

Alternatively, the trace image is doubled about the edge diameter of the photocell array by means of a dove prism positioned half way across a collimated section of the beam in the projection system to produce a second, inverted, image of the trace superimposed on the original. This recombined image is blanked off at its center and projected onto a single semicircular array as shown in FIG. 10. In both these arrangements, the error is still measured in terms of the nearest cell to the reference point to be energized. The necessary collimation of the image producing beam renders adjustments of the magnification of the optical system relatively difficult.

From the foregoing it will be evident that the invention provides precise and convenient means for measuring the displacement from a reference point of a projected image. The invention is not intended to be limited by the foregoing description, its scope being defined by the following claims.

We claim:

1. Apparatus for measuring displacement from a reference point of an optically projected image of a trace, the apparatus comprising a plurality of photocell elements arranged in line at different distances from the reference point, optical projection means for projecting the image on the photocell elements and including means for rotating the image about the reference point and electric circuit means including the photocell elements and arranged to afford an electric signal indicating the nearest element to the reference point on which the projected image falls.

2. Apparatus as claimed in claim 1 in which the electric circuit means comprises a maximum selection circuit for detection of the largest photocell element output, memory devices responsive to the maximum selection circuit outputs, and a detector circuit for detection of the memory device actuated during one rotation of the trace which is associated with the photocell element nearest to the reference point.

3. Apparatus as claimed in claim 2 in which the photocell elements include a pair of sense elements spaced from the reference point at positions to have a projected trace image similar to but spaced from the first mentioned trace image and arranged to rotate therewith incident on them when the displacement of the first mentioned trace image from the reference point indicates a negative and a positive error respectively, and in which the electric circuit means comprises a maximum selection circuit, for detection of the larger sense element output, and memory devices responsive to the maximum selection circuit outputs.

4. Apparatus as claimed in claim 2 in which the photocell elements include balance photocell means arranged to produce an output greater than any other of the elements in response to ambient light and in the absence of the trace image, the output of the balance photocell means being made to prevent actuation of the memory devices unless the output is exceeded by that of another cell.

5. Apparatus as claimed in claim 2 having recording and/or indicating devices arranged to be responsive to the outputs of the memory devices once during each rotation of the trace image.

6. Apparatus as claimed in claim 1 in which the optical projection means includes a chopper and in which the electric circuit means includes an amplifier tuned to the chopping frequency for amplifying each photocell element output, and a detector for rectifying each amplifier output.

7. Apparatus as claimed in claim 1 in which the projected trace is related to a standard profile, the apparatus including a device for moving a member bearing the trace relative to a workpiece profile in such a way that differences of the workpiece profile from the standard profile cause the projected trace image to be spaced from the reference point in correspondence with said differences.

8. Apparatus for measuring differences between a workpiece profile and a standard profile, the apparatus comprising a device having a stylus, a member on which a trace for optical projection can be formed by movement of the stylus thereon, a feeler, means for mounting a standard element having a standard profile, and means linking the feeler, the stylus, the member and the mounting means so that as the feeler tracks the standard profile the stylus forms a trace related thereto on the member optical projection means for projecting an image of the trace on a plurality of photocell elements spaced at different distances from a reference point corresponding to the stylus position, and electric circuit means including the photocell elements arranged to produce a signal indicating the nearest element to the reference point on which the projected trace image is incident, whereby, on removal of the stylus and replacement of the standard profile by a workpiece profile, any signal produced during tracking of the workpiece profile by the feeler and projection of the trace image on the photocell elements will indicate displacement of the image from the reference point due to a difference of the workpiece profile from the standard profile.

9. A method of measuring differences between a workpiece profile and a standard profile, the method comprising the steps of relatively moving a feeler and the workpiece profile so that the feeler tracks the workpiece profile thereby effecting relative movement of a member, the member bearing a trace for optical projection, and a plurality of photocells on which an image of the trace is optically projected, the photocells being differently spaced from a reference point, the trace being such that the projected image thereof passes through the reference point except when the feeler is tracking a part of the workpiece profile which differs from the standard profile, and deriving from the photocells an electric signal indicating the photocell nearest the reference point on which the projected trace image is incident.

10. A method as claimed in claim 9 having the prior step of forming the trace by relatively moving the feeler and the standard profile to effect relative movement of the trace bearing member and a stylus in manner related to the relative movement of the feeler and the profile.

11. A method as claimed in claim 10 having the step of employing a device for effecting the relative movements of the standard profile and the feeler and of the workpiece member and the stylus also for effecting the relative movements of the workpiece profile and the feeler and of the member and the photocells.

12. A method as claimed in claim 9 having the step of rotating the projected image about the reference point, the photocells being arranged in a line extending therefrom, and using said electric signal for indicating said nearest photocell once during each rotation of the image.

13. Apparatus for measuring displacement from a reference point of a radiantly projected image of a trace, said apparatus comprising:
- a plurality of elements located at positions differently spaced from said reference point, each element being adapted to produce an electric output in response to incidence of said projected image radiation thereon;
- means for relatively rotating said projected image and said elements about said reference point; and
- electric circuit means including said elements arranged to afford an electric signal indicating the nearest element to said reference point on which said projected image of radiation is incident.

14. Apparatus for measuring displacement from a reference point of a radiantly projected image of a trace, said apparatus comprising:
- a plurality of concentric ring-shaped elements centered on said reference point, each element being adapted to produce an electric output in response to incidence of said projected image radiation thereon; and
- electric circuit means including said elements and arranged to afford an electric signal indicating the nearest element to said reference point on which said projected image radiation is incident.

15. Apparatus for measuring displacement from a reference point of a radiantly projected image of a trace, said apparatus comprising:
- a semicircular array of concentric half-ring shaped elements centered on said reference point, each element being adapted to produce an electric output in response to incidence of said projected image of radiation thereon;
- means for doubling said projected image about the edge diameter of the array; and
- electric circuit means including said elements and arranged to afford an electric signal indicating the nearest element to said reference point on which said projected image radiation is incident.

16. Apparatus for measuring displacement from a reference point of a trace, said apparatus comprising:
- a pair of semicircular arrays of concentric half-ring shaped elements centered on a reference point;
- means for radiantly projecting an image of said trace on each set of arrays, each element being adapted to produce an electric output in response to incidence of said projected image radiation thereon; and
- electric circuit means including said elements and arranged to afford an electric signal indicating the nearest element to said reference point on which said projected image radiation is incident.